No. 618,846. Patented Feb. 7, 1899.
T. J. CROWDER.
POST-OFFICE DEPOSITORY.
(Application filed Oct. 14, 1897. Renewed May 17, 1898.)
(No Model.) 3 Sheets—Sheet 1.
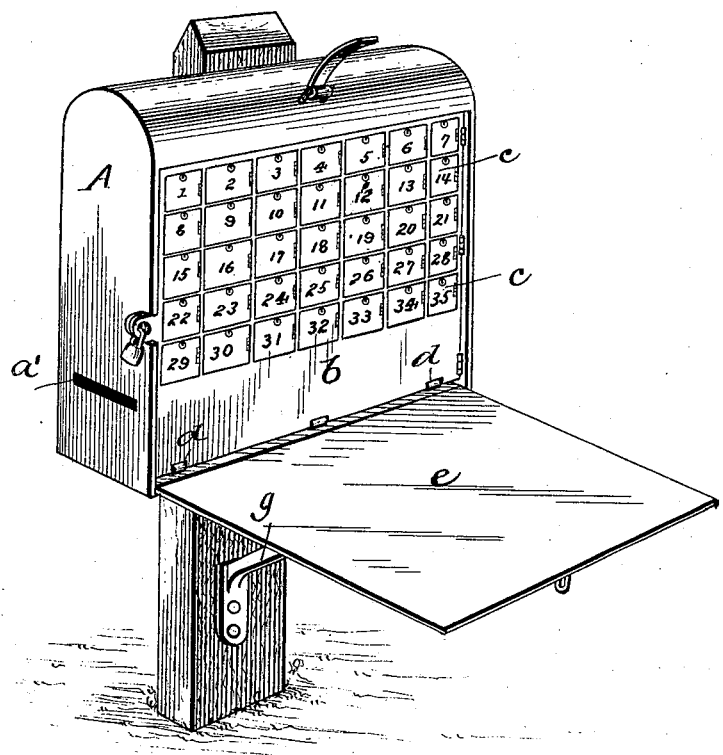
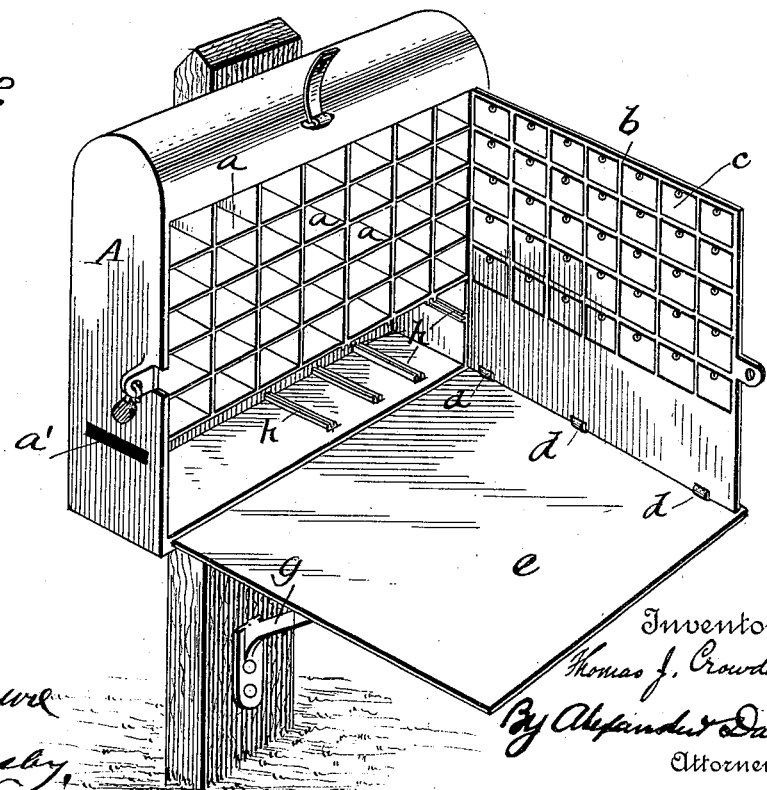

No. 618,846. T. J. CROWDER. Patented Feb. 7, 1899.
POST-OFFICE DEPOSITORY.
(Application filed Oct. 14, 1897. Renewed May 17, 1898.)
(No Model.) 3 Sheets—Sheet 2.
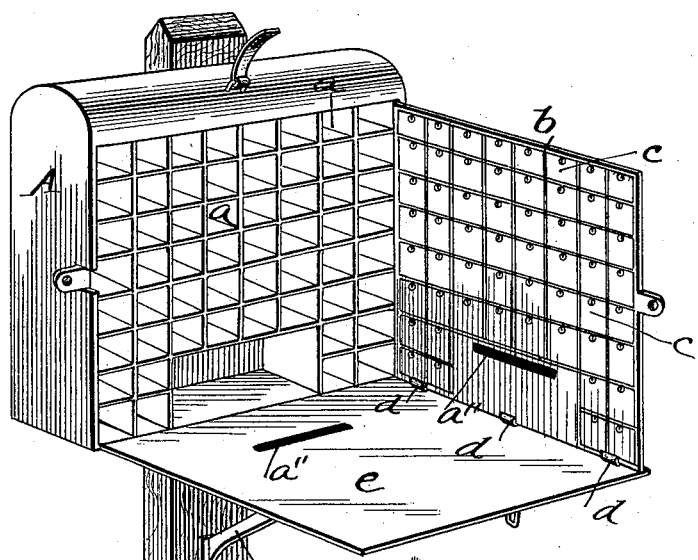
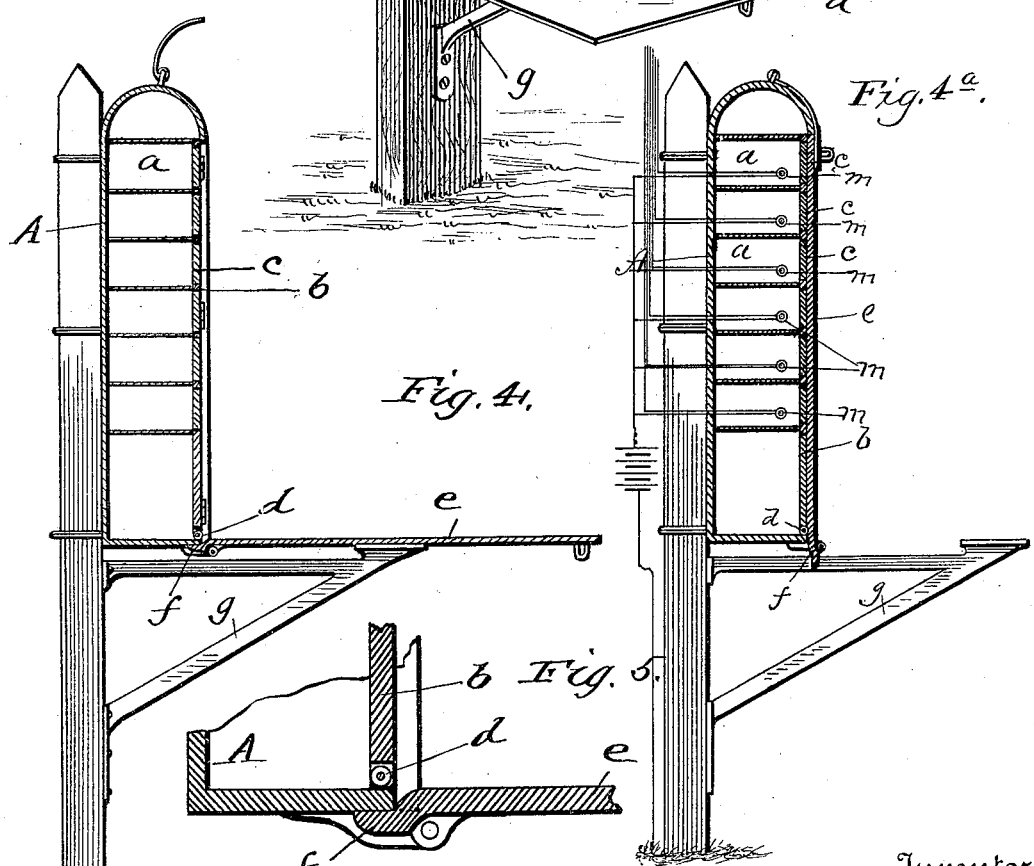
Witnesses
G. M. Lamasure
G. H. Walmsley
Inventor
Thomas J. Crowder
By Alexander & Davis
Attorneys No. 618,846. Patented Feb. 7, 1899.
T. J. CROWDER.
POST-OFFICE DEPOSITORY.
(Application filed Oct. 14, 1897. Renewed May 17, 1898.)
(No Model.) 3 Sheets—Sheet 3.
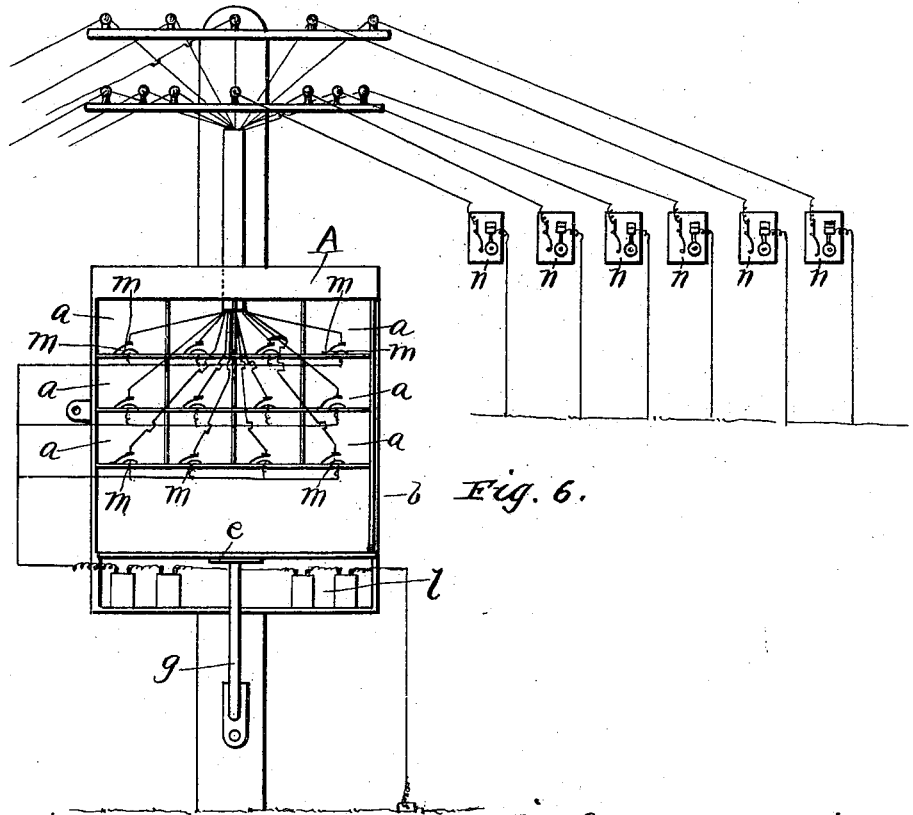
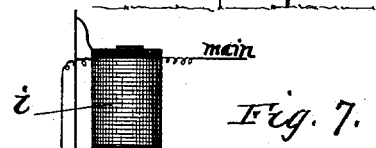
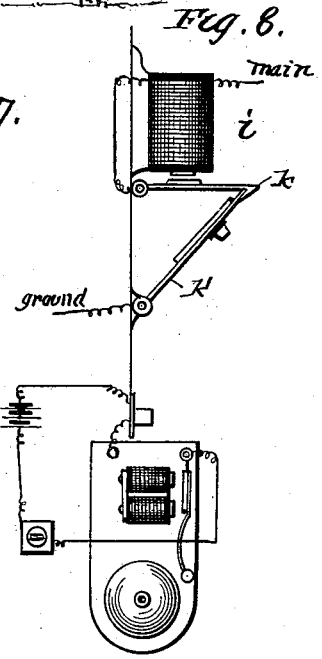
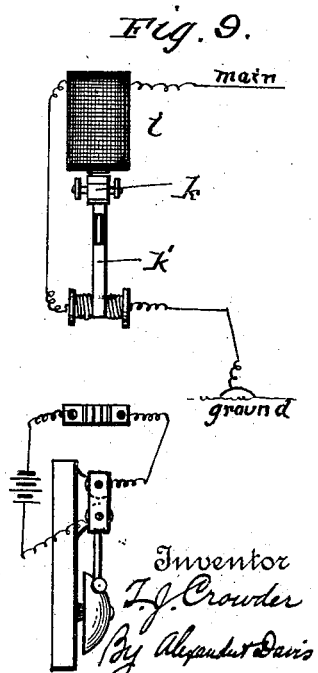
THE NORRIS PETERS CO., PHOTO-LITHO., WASHINGTON, D. C.

UNITED STATES PATENT OFFICE.

THOMAS J. CROWDER, OF STAUNTON, VIRGINIA.

POST-OFFICE DEPOSITORY.

SPECIFICATION forming part of Letters Patent No. 618,846, dated February 7, 1899.

Application filed October 14, 1897. Renewed May 17, 1898. Serial No. 680,993. (No model.)

*To all whom it may concern:*

Be it known that I, THOMAS J. CROWDER, a citizen of the United States, residing at Staunton, in the county of Augusta and State of Virginia, have invented certain new and useful Improvements in Post-Office Depositories, of which the following is a specification, reference being had therein to the accompanying drawings.

This invention is designed to provide a repository for use especially to facilitate the delivery and collection of mail in those districts where the business done is not sufficient to warrant the employment of a postmaster or to establish a free-delivery system, the apparatus not only providing a letter-box for the reception of general mail-matter, but also a series of private lock-boxes for the reception of the mail of individuals, the whole being inclosed in a single case in such a manner as to be protected alike against the weather and against theft, as more fully hereinafter appears.

It is further designed to provide the repository with simple electrical devices which will notify the owner or renter of the lock-box at his residence or place of business, as the case may be, of the deposit by the mail-carrier of mail-matter in his box, thus saving the owner or renter of the box useless trips to the repository. The invention has also other minor objects in view, which will appear in the course of this specification.

Referring to the drawings, Figure 1 is a perspective view of the repository with the outer door open; Fig. 2, a similar view with the two doors open; Fig. 3, a view similar to Fig. 2, showing a slightly-modified form; Fig. 4, a vertical section through Fig. 1; Fig 4$^a$, a vertical section showing both doors closed; Fig. 5, a detail section hereinafter described; Fig. 6, a diagram of the electrical appliances I prefer using; Fig. 7, a detail side view of one form of the annunciator, and Figs. 8 and 9 are views of another form of annunciator.

Referring to the drawings by letters, A designates the main casing, which is preferably constructed of strong metal plates bolted or cast together, which is adapted to be secured to a post or other suitable support. The front side of this casing is open, and built or formed in it are a suitable number of pigeonholes or boxes $a$, whose open ends face the open side of the casing. These boxes fill the entire upper portion of the casing, the lower portion thereof being left vacant to form a letter-box for the reception of general mail-matter, a deposit-slot $a'$ being made in one side of the casing. Closing the front side of the casing is a door $b$, hinged to one vertical edge of the casing and adapted to swing out to one side. This door fits in between the side and bottom and top edges of the casing close up to the boxes $a$, said edges projecting out beyond the face of the door. This door is locked in any suitable manner. It is shown in the drawings locked at the edge opposite its hinge edge by means of a padlock and correspondingly-shaped ears on the door and casing. The door is provided with a series of small doors $c$, opening outward and provided with suitable locks, each one of these doors coming opposite one of the small boxes $a$, so that access may be had to said boxes without opening door $b$. The door $b$ is also provided with small rollers $d$ on its lower edge, which rest on the bottom of the casing and assist in supporting the door.

Hinged to the lower edge of the casing is another door $e$, which also fits within the edges of the casing flush with the same and close against the door $b$, this door being adapted to swing downward and be suitably supported in a horizontal position. Any suitable means may be used to support the door horizontally. I have shown a flange $f$ on the lower edge of the door, which engages under the lower edge of the casing when the door is let down, and a bracket $g$ carried by the post and projecting out under the door. This door is also provided with suitable means for locking it.

It is intended that these repositories shall be located at convenient points along the routes of rural mail-carriers, in stores or residences, or under a suitable shed constructed for the purpose. The carrier possesses keys for both doors, so that he has access to all the small boxes. In distributing mail the carrier first opens down the outer door to a horizontal position and then swings open the inner door, which latter runs out on the former and is supported thereby and is prevented from moving off therefrom by the door coming against the vertical edge of the main casing near the hinges. The outer door thus affords a convenient table for the use of the carrier in sorting his mail, and the inner edge serves as a guard to keep the mail-matter from falling off the table and to protect it against the wind and weather.

As for the individual renting-boxes, each person is to have two keys—one for the outer door and one for his particular box—whereby he is prevented having access to boxes other than his own or to the general receptacle below. It will be seen that as the inner door fits close up to the inner boxes it will be impossible for the user of one box to tamper with the contents of an adjacent box, and it will also be seen that as the doors fit closely within the edges of the main box there will be little opportunity for thieves to pry open the door or for rain-water to get into the boxes.

It will be understood, of course, that the number and arrangement of boxes may be greatly varied as the exigencies of the case may require, and, if desired, the vertical partitions forming the boxes may be made removable and to rest in flanges formed on the horizontal partitions, as shown at $h$ in Fig. 2, so that the number and arrangement of boxes in each repository may be varied. These flanges will also permit a portion of the general letter-box to be utilized for boxes for other purposes, if desired; but of course if this space be utilized for private boxes additional small doors will have to be provided in the larger door, the small doors being mounted in suitable removable frames, so that they can be readily secured to and detached from the door. It will also be observed that the removable partitions are advantageous in that they permit two or more boxes to be thrown into one should a person desire to rent a box larger than the regular size.

Any suitable system of electrical appliances may be employed to notify the owners of the private boxes when mail is placed in the respective boxes, thereby saving them the trouble of making useless trips to the repository. As shown in Fig. 6, the battery may be located in a receptacle $l$ beneath the repository and one terminal grounded and the other carried up into the repository and connected to the push-buttons $m$ in the boxes, one push-button (or other circuit-closer, automatic or otherwise) being provided for each box. From each of the circuit-closers a separate wire runs to the residence of the box-owner and connects to a suitable electric bell or other annunciator $n$. I prefer the simple form of annunciator shown in Fig. 7, in which an electromagnet $i$ actuates a suitable armature $k$, which latter holds up a suitable spring-actuated arm $k'$, pivoted below the armature and adapted when released to spring or fall downward by its own weight against a bell $k^2$. The main conductor is connected to the magnet and from there extends to the hook-like armature $k$, and then from the pivoted end arm $k'$ to the ground or to the common return-wire, whichever may be used. In this way it will be observed that the circuit will be broken the instant the annunciator is actuated, leaving the battery-power to be used on the other circuits. If desired, the circuits may be arranged so that the owner of the annunciator may signal back to the repository that the signal has been received, any of the ordinary devices being used for this purpose. Another form of annunciator which may be used is shown in Figs. 7 and 8. In this form the pivoted lever $k'$ instead of striking a gong closes the local circuit, in which a suitable electric bell is arranged, whereby a continuous alarm will be sounded until some one appears and resets the annunciator.

As shown in Fig. 3, the letter-box for general mail-matter is shown at the center of the repository, and the letter-slot, as at $a''$, is formed through the two main doors.

The arrangement of doors shown and described has several important advantages. The two large doors, opening at right angles to each other, the horizontally-swinging one being supported upon and prevented from moving off the edge of the other, form a sort of protected compartment in close juxtaposition to the private boxes, as well as to the general letter-box below, thereby giving the carrier immediate access to all the boxes in the casing. The carrier is thus enabled in the compartment to not only conveniently distribute the mail he has brought along with him, but to also sort and stamp the matter he collects from the drop-box below and immediately distribute such of it as belongs in the private boxes in that particular repository or in any others on his route, each carrier or repository being provided with a stamping outfit. In this way a more prompt delivery of the local mail-matter may be accomplished and considerable labor and expense saved, these being important considerations in the matter of rural delivery.

The object in placing the doors of the private boxes in the inner door is to avoid using an additional door or doors at the rear side of the repository, thereby not only making the same stronger and more inexpensive, but also enabling the same to be fastened with its back to a post or wall, in which position it will be better protected against robbery and will take up the least amount of space. It will be observed that the outer door serves not only as a sorting-table, but also as an armor to protect the doors of the private boxes.

Having thus fully described my invention, what I claim, and desire to secure by Letters Patent, is—

1. In a repository for mail-matter, the combination of a main casing open on its front side and having a series of small boxes formed inside it, the open ends of these boxes being outward, a large door closing said casing, and a series of small doors carried by said large door and corresponding with the boxes in the casing, and a platform or table projecting from the casing and serving in conjunction with said large door and the casing to form a compartment protected from wind, &c., in juxtaposition to said small boxes.

2. In a repository for mail-matter, the main casing, having its front side open and having in it a series of small boxes opening outward, a large inner door hinged at one edge of the casing and adapted to swing outward and provided with a series of small doors registering with the boxes in the casing, and a large outer door adapted to close over the inner door and to fold down and serve as a sorting-table and, in conjunction with the casing and inner door, form a compartment protected from wind, &c.

3. In a mail-repository, the combination of a main casing having one side open and inclosing the series of private post-office boxes, an inner door hinged to one side of the casing and adapted to close the open side of the same and fit close to the outer end of the private boxes, said inner door being provided with small doors corresponding with said boxes, and an outer door hinged to the lower end of the repository and means for supporting this door in a horizontal position, said inner and outer doors forming in conjunction with the casing a compartment protected from wind, &c.

4. In a post-office repository, a main casing, open at its front side and having inclosed in it a series of private boxes and a general letter-box, these boxes opening outward and the casing being provided with a drop-slot leading to the general box, an outer door hinged at its lower edge to the casing and means for supporting it in an open horizontal position, an inner door hinged at one vertical edge to the casing and adapted to swing out over the outer door, a stop preventing this door moving beyond the edge of the outer door, and means for locking both doors closed one over the other, substantially as described.

5. In a post-office repository, a main casing inclosing a series of private boxes and a general letter-box, these boxes opening toward the front side of the casing and the casing being provided with a drop-slot leading to the general letter-box, an inner door hinged to the casing at one vertical edge and adapted to close all said boxes and swing out against a stop to one side, said inner door being provided with a series of small doors opening outward and coinciding with the private boxes, an outer door adapted to open downward and close up over the series of small doors, and means for locking each of the doors, substantially as described.

6. In a repository for mail-matter, the combination of a main casing open on its front side and having a series of small boxes formed inside it, the open ends of these boxes being outward, an independent circuit-closer in each of said small boxes, an annunciator electrically connected to each of said circuit-closers, a large door closing said casing, a series of small doors carried by said large door and corresponding with the boxes in the casing, and a platform or table projecting from the casing and serving in conjunction with said large door and the casing to form a compartment protected from the wind, &c., in juxtaposition to said small boxes.

In testimony whereof I affix my signature in presence of two witnesses.

THOMAS J. CROWDER.

Witnesses:
C. D. DAVIS,
WM. H. FOWLE.